G. P. HELFRICH.
MOWER.
APPLICATION FILED AUG. 20, 1917.
1,275,253.
Patented Aug. 13, 1918.
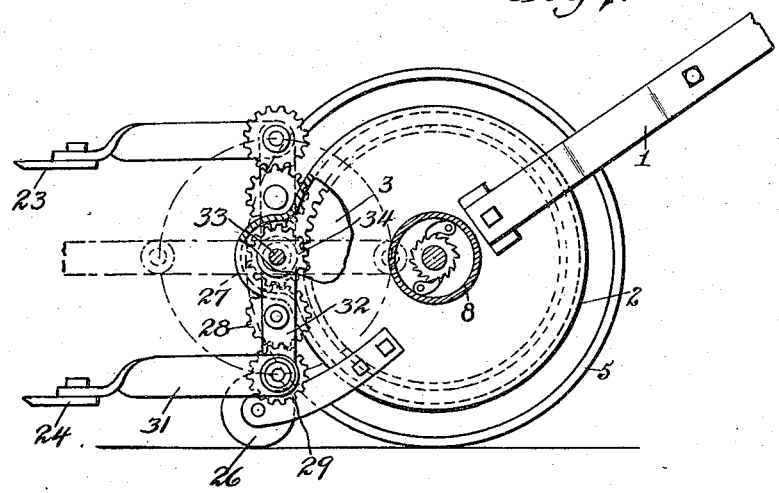
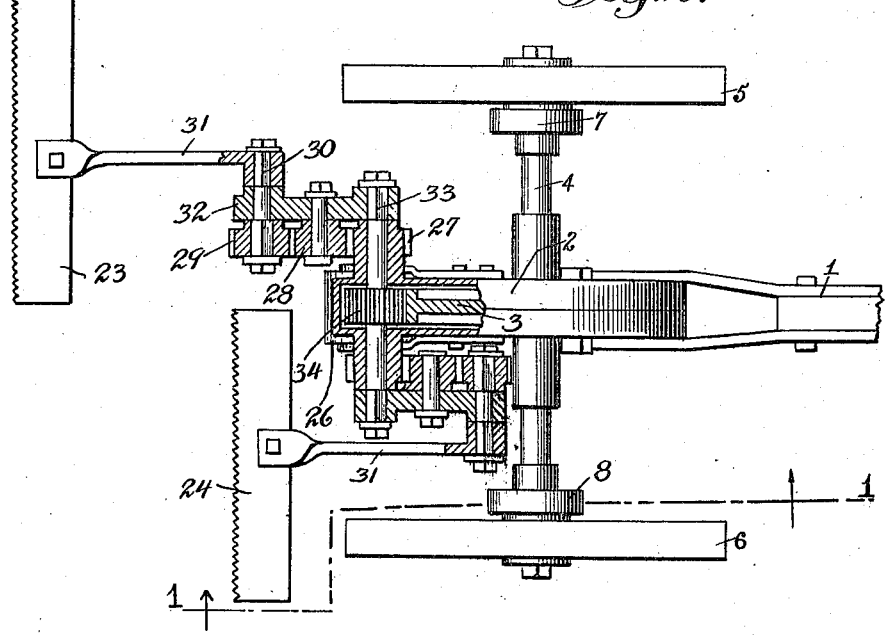
WITNESSES
INVENTOR
Gustav P. Helfrich
BY
ATTORNEYS

UNITED STATES PATENT OFFICE.

GUSTAV P. HELFRICH, OF NEW YORK, N. Y.

MOWER.

1,275,253.  Specification of Letters Patent.  Patented Aug. 13, 1918.

Application filed August 20, 1917. Serial No. 187,111.

*To all whom it may concern:*

Be it known that I, GUSTAV P. HELFRICH, a citizen of the United States, and a resident of the city of New York, borough of Bronx, in the county of Bronx and State of New York, have invented a new and Improved Mower, of which the following is a full, clear, and exact description.

This invention relates to mowing machines, and in particular to what are commonly termed lawn mowers, though the construction may be utilized in a plurality of different types of mowers without departing from the spirit of the invention.

The object in view is to provide a mowing machine having a plurality of blades and a simple, strong mechanism for moving said blades in a circle so that the cutting movement will be toward the front and upwardly.

Another object in view is to provide a mowing machine having a plurality of cutters moving in a circle, a driving mechanism therefor which automatically holds the blades in a horizontal plane as they are moved whereby the edge of the blades may strike squarely the matter to be cut.

In the accompanying drawings:

Figure 1 is a longitudinal vertical section through a mowing machine disclosing the present invention, same being approximately on the line 1—1 of Fig. 2.

Fig. 2 is a top plan view of a mowing machine embodying the invention, certain parts being broken away for better illustrating the structure.

Referring to the accompanying drawings by numerals, 1 indicates a handle of any desired kind which may be connected in any suitable manner to casing 2, carrying a large or master gear wheel 3, and a power shaft 4, said power shaft being connected with traction wheels 5 and 6 through suitable pawl and ratchet clutches 7 and 8. The master gear wheel 3 meshes continually with pinion 34 arranged in casing 2 which has rigidly secured thereto or formed integral therewith, a pinion 27 which meshes with an idle pinion 28, said idle pinion in turn meshing with a driving pinion 29, said driving pinion being rigidly secured to shaft 30, which shaft has rigidly secured thereto an arm 31 carrying the cutting blade. The pinions 28 and 29 are carried by an arm 32 which is rigidly secured to shaft 33, said shaft extending through the casing 2 and being rotated by the pinion 34 meshing with a master gear 3. By this construction and arrangement whenever the mower is moved forwardly during the cutting operation pinion 3 will be rotated and arm 32 will be rotated. As arm 32 is rotated the idle pinion 28 will move or walk around the pinion 27, consequently will rotate the pinion 29 in a reverse direction with the movement of the arm 32 and at a proportional speed thereto by reason of the sizes of pinions whereby the arm 31 is continually maintained in a horizontal plane. One side of the machine has just been described in connection with arm 31 and associate parts, but it will be evident that the shaft 33 extends from the pinion 34 and operates a similar mechanism on the other side so that there will be utilized two cutting blades. A depth roller 26 is provided which is bolted to the casing 2 in any suitable manner, and if desired may be provided with slots for accommodating the bolts so as to permit any desired adjustment.

What I claim is:

1. A device of the character described comprising a driving shaft, a pinion connected with said shaft, a master gear meshing with the pinion for rotating the same, an arm rigidly secured to said driving shaft, a stationary pinion surrounding said driving shaft, an idler pinion rotatably mounted on said arm and meshing with said stationary pinion, a rotatable shaft arranged on said arm, and a pinion rigidly secured to said rotatable shaft on said arm, said last mentioned pinion meshing with said idler pinion, whereby when said arm is rotated the idler pinion will move around the stationary pinion and thereby communicating motion to the last mentioned pinion.

2. A device of the character described comprising a master gear, a pinion meshing with said gear, a driving shaft rigidly secured to said pinion, a casing acting as a journal for said driving shaft, a stationary pinion mounted on said casing and arranged so that the center will be coincident with the center of said driving shaft, an arm having one end rigidly secured to said driving shaft so as to be rotated thereby, an idler pinion mounted on said arm and meshing with said stationary pinion, a rotatable shaft mounted on said arm, a pinion rigidly secured to said rotatable shaft and meshing with said idler pinion, and means rigidly secured to said rotatable shaft for supporting a cutter, whereby when said arm is rotated said supporting means will be held continually in a vertical position this moving in a circle.

GUSTAV P. HELFRICH.

Copies of this patent may be obtained for five cents each, by addressing the "Commissioner of Patents, Washington, D. C."